United States Patent [19]

Ohta et al.

[11] Patent Number: 5,512,653
[45] Date of Patent: Apr. 30, 1996

[54] LACTIC ACID CONTAINING HYDROXYCARBOXYLIC ACID FOR THE PREPARATION OF POLHYDROXYCARBOXYLIC ACID

[75] Inventors: Masahiro Ohta; Shoji Obuchi; Yasunori Yoshida, all of Fukuoka, Japan

[73] Assignee: Mitsui Toatsu Chemicals, Inc., Tokyo, Japan

[21] Appl. No.: 488,091

[22] Filed: Jun. 7, 1995

Related U.S. Application Data

[62] Division of Ser. No. 170,873, Dec. 21, 1993, Pat. No. 5,444,143.

[30] Foreign Application Priority Data

| Dec. 25, 1992 | [JP] | Japan | 4-346329 |
| Dec. 25, 1992 | [JP] | Japan | 4-346330 |
| Apr. 2, 1993 | [JP] | Japan | 5-077002 |
| Apr. 6, 1993 | [JP] | Japan | 5-079219 |
| Apr. 9, 1993 | [JP] | Japan | 5-082867 |
| Sep. 16, 1993 | [JP] | Japan | 5-229796 |
| Sep. 17, 1993 | [JP] | Japan | 5-231526 |
| Sep. 17, 1993 | [JP] | Japan | 5-231527 |

[51] Int. Cl.⁶ .................................................. C08G 63/06
[52] U.S. Cl. .................. 528/361; 528/271; 528/274; 528/275; 528/283; 528/354; 528/357; 524/755; 524/784
[58] Field of Search ................................ 528/361, 271, 528/274, 275, 283, 354, 357; 524/755, 784

[56] References Cited

U.S. PATENT DOCUMENTS

| 4,273,920 | 6/1981 | Nevin | 528/361 |
| 5,302,894 | 4/1994 | Buchholz | 528/354 |
| 5,310,865 | 5/1994 | Enomoto et al. | 528/361 |

FOREIGN PATENT DOCUMENTS

| 026599 | 4/1981 | European Pat. Off. . |
| 443542 | 8/1991 | European Pat. Off. . |
| 572675 | 12/1993 | European Pat. Off. . |
| WO78/00011 | 12/1978 | WIPO . |

OTHER PUBLICATIONS

H. G. Ellas, "Makromolekule Band 1, Grundlagen", 1990, pp. 231–232.
Database WPI, Week 8717, JPA-62064823.
Chemical Abstracts, vol. 120, No. 10, Mar. 7, 1994, Abstract No. 10788 m.

*Primary Examiner*—Samuel A. Acquah
*Attorney, Agent, or Firm*—Burns, Doane, Swecker & Mathis

[57] ABSTRACT

A preparation process of polyhydroxycarboxylic acid having an inherent viscosity of 0.3 dl/g or more by dehydrating polycondensation of lactic acid containing hydroxycarboxylic acid in an organic solvent in the presence or absence of a catalyst, comprising using a hydroxycarboxylic acid raw material which comprises one or more impurities selected from the group consisting of methanol, ethanol, acetic acid, pyruvic acid, fumaric acid, methyl lactate, ethyl lactate and butyl lactate in a total amount of 0.3% by mole or less for the amount of said hydroxycarboxylic acid raw material.

16 Claims, No Drawings

LACTIC ACID CONTAINING HYDROXYCARBOXYLIC ACID FOR THE PREPARATION OF POLHYDROXYCARBOXYLIC ACID

This application is a division of Ser. No. 08/170,873 filed Dec. 21, 1993, now U.S. Pat. No. 5,444,143.

BACKGROUND OF THE INVENTION AND RELATED ART

1. Field of the Invention

The present invention relates to a preparation process of polyhydroxycarboxylic acid which is a degradable polymer used for medical materials and a substitute of general purpose resin, and more particularly, the invention relates to a preparation process of polyhydroxycarboxylic acid from a raw materials containing a certain amount or less of specific impurities.

2. Related Art of the Invention

Polyhydroxycarboxylic acid is excellent in mechanical strength, physical properties and chemical resistance, and additionally has biodegradability which can be harmlessly degraded under natural environment and finally decomposed by microorganisms into carbon dioxide and water. As a result, polyhydroxycarboxylic acid has been particularly focused on as a plastic used for medical materials and a substitute for general purpose resin. It has been known in the preparation of polyhydroxycarboxylic acid that, for example, lactic acid and glycolic acid are usually dimerized by dehydration to obtain a cyclic dimer, and subsequent ring opening polymerization of the cyclic dimer is carried out in the presence of a tin catalyst to obtain a high molecular weight polymer. The process, however, requires complex operation in conducting the reaction and thus the polymer obtained becomes expensive. Additionally, the process is carried out by melt polymerization and the resulting molten polymer is extruded and cut into pellets. Consequently, the product obtained by the process is restricted to pellets. Further, some of the hydroxycarboxylic acids do not form the cyclic dimer and the process cannot be applied.

On the other hand, Japanese Laid-Open Patent SHO 59-096123 and 61-28521 have disclosed processes for preparing polyhydroxycarboxylic acid by dehydrating polycondensation directly from hydroxycarboxylic acid or its oligomers. However, polymers obtained by these processes have an inherent viscosity of about 0.3 dl/g or less, do not have satisfactory mechanical strength and cannot be applied to some uses and objects.

Consequently, polyhydroxycarboxylic acid having sufficient mechanical strength is limited to melt polymerization and the composition of the polymer is also limited.

SUMMARY OF THE INVENTION

The object of the invention is to provide a process for preparing high molecular weight polyhydroxycarboxylic acid efficiently in industry, with ease and inexpensively.

The present inventors have carried out an intensive investigation in order to obtain high molecular weight polyhydroxycarboxylic acid by direct dehydrating polycondensation of hydroxycarboxylic acid.

As a result, they have found that the high molecular weight polyhydroxycarboxylic acid can be obtained by using as a raw material hydroxycarboxylic acid having a certain amount or less of specific impurities. Thus, the present invention has been completed.

That is, the aspect of one invention is a preparation process of polyhydroxycarboxylic acid having an inherent viscosity of 0.3 dl/g or more by dehydrating polycondensation of lactic acid containing hydroxycarboxylic acid in an organic solvent in the presence or absence of a catalyst, comprising using a hydroxycarboxylic acid raw material which comprises one or more impurities selected from the group consisting of methanol, ethanol, acetic acid, pyruvic acid, fumaric acid, methyl lactate, ethyl lactate and butyl lactate in a total amount of 0.3% by mole or less for the amount of said hydroxycarboxylic acid.

The invention also relates to lactic acid containing hydroxycarboxylic acid which is used for the raw material of polyhydroxycarboxylic acid.

The invention uses hydroxycarboxylic acid raw material having a low content of specific impurities and can thereby produce high molecular weight polyhydroxycarboxylic acid inexpensively in industry by direct dehydrating polycondensation of lactic acid containing hydroxycarboxylic acid.

DETAILED DESCRIPTION OF THE INVENTION

Exemplary hydroxycarboxylic acids which can be used in the invention include 2-hydroxyethanoic acid, 2-hydroxypropanoic acid, 2-hydroxybutanoic acid, 2-hydroxypentanoic acid, 2-hydroxyhexanoic acid, 2-hydroxyheptanoic acid, 2-hydroxyoctanoic acid, 2-hydroxy-2-methylpropanoic acid, 2-hydroxy-2-methylbutanoic acid 2-hydroxy-2-ethylbutanoic acid. 2-hydroxy-2-methylpentanoic acid 2-hydroxy-2-ethylpentanoic acid. 2-hydroxy-2-propylpentanoic acid 2-hydroxy-2-butylpentanoic acid. 2-hydroxy-2-methylhexanoic acid 2-hydroxy-2-ethylhexanoic acid, 2-hydroxy-2-propylhexanoic acid 2-hydroxy-2-butylhexanoic acid, 2-hydroxy-2-pentylhexanoic acid 2-hydroxy-2-methylheptanoic acid, 2-hydroxy-2-ethylheptanoic acid 2-hydroxy-2-propylheptanoic acid, 2-hydroxy-2-butylheptanoic acid 2-hydroxy-2-pentylheptanoic acid. 2-hydroxy-2-hexylheptanoic acid 2-hydroxy-2-methyloctanoic acid, 2-hydroxy-2-ethyloctanoic acid 2-hydroxy-2-propyloctanoic acid, 2-hydroxy-2-butyloctanoic acid 2-hydroxy-2-pentyloctanoic acid, 2-hydroxy-2-hexyloctanoic acid 2-hydroxy-2-heptyloctanoic acid, 3-hydroxypropanoic acid, 3-hydroxybutanoic acid, 3-hydroxypentanoic acid, 3-hydroxyhexanoic acid, 3-hydroxyheptanoic acid, 3-hydroxyoctanoic acid, 3-hydroxy-3-methylbutanoic acid, 3-hydroxy-3-methylpentanoic acid, 3-hydroxy-3-ethylpentanoic acid 3-hydroxy-3-methylhexanoic acid, 3-hydroxy-3-ethylhexanoic acid 3-hydroxy-3-propylhexanoic acid, 3-hydroxy-3-methylheptanoic acid 3-hydroxy-3-ethylheptanoic acid, 3-hydroxy-3-propylheptanoic acid 3-hydroxy-3-butylheptanoic acid, 3-hydroxy-3-methyloctanoic acid 3-hydroxy-3-ethyloctanoic acid, 3-hydroxy-3-propyloctanoic acid 3-hydroxy-3-butyloctanoic acid, 3-hydroxy-3-pentyloctanoic acid, 4-hydroxybutanoic acid, 4-hydroxypentanoic acid, 4-hydroxyhexanoic acid, 4-hydroxyheptanoic acid, 4-hydroxyoctanoic acid, 4-hydroxy-4methylpentanoic acid, 4-hydroxy-4-methylhexanoic acid, 4-hydroxy-4ethylhexanoic acid, 4-hydroxy-4-methylheptanoic acid, 4-hydroxy-4-ethylheptanoic acid, 4-hydroxy-4-propylheptanoic acid, 4-hydroxy-4-methyloctanoic acid, 4-hydroxy-4-ethyloctanoic acid, 4-hydroxy-4-propyloctanoic acid, 4-hydroxy-4-butyloctanoic acid, 5-hydroxypentanoic acid, 5-hydroxyhexanoic acid, 5-hydroxyheptanoic acid, 5-hydroxyoctanoic acid. 5-hydroxy-5-methylhexanoic acid, 5-hydroxy-5-methylhepanoic acid, 5-hydroxy-5-ethylheptanoic acid, 5-hydroxy-5-methyl-octanoic acid, 5-hydroxy-5-ethyloctanoic acid, 5-hydroxy-5-propyloctanoic acid, 6-hydroxyhexanoic acid, 6-hydroxyheptanoic acid, 6-hydroxyoctanoic acid, 6-hydroxy-6-methylheptanoic acid, 6-hydroxy-6-methyloctanoic acid, 6-hydroxy-6-ethyloctanoic acid, 7-hydroxyheptanoic acid, 7-hydroxyoctanoic acid, 7-hydroxy-7-methyloctanoic acid, 8-hydroxyoctanoic acid and other aliphatic hydroxycarboxylic acids.

These hydroxycarboxylic acids can be used singly or as a mixture in an amount of 99% by weight or less for the weight of lactic acid.

Some of these hydroxycarboxylic acids have optically active isomers and are divided into D-, L- and D/L-isomers. However, no particular restriction is imposed in the invention upon the structure of these isomers.

Polyhydroxycarboxylic acid of the present invention is a lactic acid homopolymer or a lactic acid/hydroxycarboxylic acid copolymer which is obtained by using the above lactic acid containing hydroxycarboxylic acid as a raw material, and also includes a random polymer and a block copolymer.

Lactic acid is generally prepared by fermenting starch and purifying the fermented product and considerably pure lactic acid is marketed. However, lactic acid obtained by the process still contains one or more impurities selected from methanol, ethanol, acetic acid, pyruvic acid, fumaric acid, methyl lactate, ethyl lactate and butyl lactate.

The total amount of these impurities in the invention is 0.3% by mole or less, preferably 0.1% by mole or less, more preferably 0.05% by mole or less of the amount of said hydroxycarboxylic acid raw material.

The invention also includes embodiments for preparing a prepolymer from the above hydroxycarboxylic acid and successively preparing polyhydroxycarboxylic acid from the prepolymer.

In the process of the invention, the catalyst is preferably used with due regard to the reaction time (the reaction rate).

The catalysts used in the invention include the group I, II, III, IV and V metals, or salts, hydroxides and oxides of these metals.

Exemplary catalysts which can be used include zinc, tin, aluminum, magnesium and other metals; tin oxide, antimony oxide, zinc oxide, aluminum oxide, magnesium oxide, titanium oxide and other metal oxides; zinc chloride, stannous chloride, stannic chloride, stannous bromide, stannic bromide, antimony fluoride, magnesium chloride, aluminum chloride and other metal halogenides; sodium hydroxide, potassium hydroxide, calcium hydroxide, magnesium hydroxide, aluminum hydroxide, zinc hydroxide, iron hydroxide, cobalt hydroxide, nickel hydroxide, copper hydroxide, cesium hydroxide, strontium hydroxide, barium hydroxide, lithium hydroxide, zirconium hydroxide and other metal hydroxides; tin sulfate, zinc sulfate, aluminum sulfate, and other metal sulfates, magnesium carbonate, zinc carbonate, calcium carbonate and other metal carbonates; tin acetate, tin octoate, tin lactate, zinc acetate, aluminum acetate, iron lactate and other metal organic carboxylates; and tin trifluoromethanesulfonate, tin p-toluenesulfonate and other metal organic sulfonates.

Other exemplary catalysts include, for example, dibutyltin oxide and other organic metal oxides of above metals, titanium isopropoxide and other metal alkoxide of above metals, diethylzinc and other alkyl metals of above metals, and DOWEX™ and AMBERLITE™ and other ion exchange resins. The amount of these catalysts is preferably 0.0001~10% by weight for the weight of the above hydroxycarboxylic acids.

Organic solvents used in the invention include, for example, aromatic hydrocarbons and aromatic ethers.

Exemplary solvents which can be used include toluene, xylene, naphthalene, biphenyl, chlorobenzene, o-chlorotoluene, m-chlorotoluene, p-chlorotoluene and other aromatic hydrocarbons; anisole, ethoxybenzene, propoxybenzene, butoxybenzene, pentoxybenzene, 2,4-dimethoxybenzene, 2-chloromethoxybenzene, 2-bromomethoxybenzene, 4-chloromethoxybenzene, 4-bromomethoxybenzene, 2,4-dichloromethoxybenzene and other alkoxybenzenes; and diphenyl ethers such as diphenyl ether, 3,3'-dimethyldiphenyl ether, 3-methyldiphenyl ether and other alkyl-substituted diphenyl ethers; 4,4'-dibromodiphenyl ether, 4,4'-dichlorodiphenyl ether, 4-bromodiphenyl ether, 4-methyl-4-bromodiphenyl ether and other halogen substituted diphenyl ethers; 4-methoxydiphenyl ether, 4,4'-dimethoxydiphenyl ether, 3,3'-dimethoxydiphenyl, 4-methyl-4'-methoxydiphenyl ether and other alkoxy substituted diphenyl ethers; and dibenzofuran, xanthene and other cyclic diphenyl ethers. Preferred solvents are anisole and diphenyl ether. These solvents can be used singly or as a mixture and no particular restriction is imposed upon the mixture.

The amount of these solvent is in the range so as to obtain a polymer concentration of usually 3~70% by weight, preferably 5~50% by weight. A polymer concentration exceeding 70% by weight results in an extremely high viscosity when the polymer is dissolved by heating and sometimes leads to difficulty in operation such as stirring in the reaction and liquid transfer of the reaction mixture obtained. On the other hand, when the polymer concentration is less than 3% weight, volume efficiency is low, although no problem is caused on the reaction and post-treatment.

The dehydrating polycondensation can be carried out in the atmospheric pressure or under reduced pressure and in the temperature range up to the refluxing temperature of the solvent, that is, 50°~250° C., preferably 100°~170° C. When the temperature is less than 50° C., the water generated by the reaction is removed out of the reaction system in poor efficiency by azeotropic distillation with the solvent, and thus the reaction rate tends to be reduced.

On the other hand, a temperature exceeding 250° C. leads to deterioration of the polymer and sometimes causes color development the reaction mixture and impairment of the product quality obtained.

The polycondensation reaction of the invention can be carried out in the presence of a discoloration inhibitor in order to inhibit color development due to heat deterioration in the polycondensation. The discoloration inhibitors which can be preferably used are phosphoric acid, triphenyl phosphate, pyrophosphoric acid, phosphorous acid, triphenyl phosphite and other phosphorus compounds.

The amount of the discoloration inhibitor is usually 0.01~5% by weight, preferably 0.5~2% by weight. The amount of less than 0.01% by weight reduces the effect for inhibiting color development. When the amount exceeds 5% by weight, the effect for inhibiting color development is not increased any more and a sufficient polymerization degree cannot sometimes be obtained.

The reaction progresses by dehydrating polycondensation and thus the equipment used for the reaction must be fitted with a device for removing the water generated with the progress of the reaction in order to obtain a high molecular weight polymer.

Removing the generated water can be carried out with a system where the solvent distilled out under refluxing is treated with a drying agent and returned again to the reaction system, a system where the reaction is carried out in a reactor equipped with a device having a distillation-separation ability and a refluxing mixture of the solvent with water is subjected to distillation-separation and a dehydrated solvent obtained after removing the water is returned alone to the reaction system, or a system where a solvent-water mixture is first taken out of the reaction system, charged to a distillation apparatus in order to separate water by distillation and a dehydrated solvent alone is returned to the reaction system.

The water content of the solvent which is returned to the reaction system depends upon the amount of the solvent and the inherent viscosity of the desired polymer and is usually 100 ppm or less, preferably 10 ppm or less. When a high inherent viscosity is desired, acceptable water content is reduced. On the other hand, a low inherent viscosity increases acceptable water content. Thus, the water content of the solvent is suitably determined depending upon the desired inherent viscosity.

Polyhydroxycarboxylic acid having an inherent viscosity of 0.3 dl/g or more, preferably 0.3~5 dl/g and further preferably 0.8~5 dl/g can be efficiently and inexpensively prepared by the process of the invention.

EXAMPLE

The present invention will hereinafter be illustrated by way of examples. However, the invention is not intended to be limited to the specific embodiments and equipment illustrated hereinafter.

The inherent viscosity (η inh) is illustrated by the following equation:

$$\eta\ inh = \frac{\ln(t/t_0)}{C}$$

wherein
 $t_0$=flow down time of a solvent in a viscometer.
 t=flow down time of a dilute polymer solution in the same viscometer and the same solvent.
 C=concentration in grams of a solid polymer in 100 ml of the solvent.

Measurement was carried out at 20° C. in a concentration of 0.1 g solid polymer/100 ml dichloromethane.

EXAMPLE 1

After heat-stirring 75.0 g of 90% L-lactic acid containing 130 ppm of methanol (methanol content was 0.04 mol % for lactic acid) at 130° C. for 3 hours under reduced pressure of 50 mmHg while removing water out of the reaction system, 325 g of diphenyl ether and 0.4 g of tin powder were added. A tube packed with 75 g of molecular sieve 3 A was thereafter mounted on the reaction vessel so as to return the solvent distilled out by refluxing to the reaction system by way of the molecular sieve. The reaction was further conducted at 130° C. for 30 hours under reduced pressure of 15 mmHg.

After finishing the reaction, the reaction mixture was dissolved in 400 ml of chloroform and tin powder was removed by suction filtering the resulting solution. The filtrate obtained was mixed with 1400 ml of methanol. The precipitated pale yellow solid was filtered and dried to obtain 50.1 g of polylactic acid.

The yield was 92.8%, the inherent viscosity was 1.30 dl/g, and the weight average molecular weight was 180,000 (converted to polystyrene).

EXAMPLE 2

The same procedures as described in Example 1 were carried out except that 90% L-lactic acid containing 500 ppm of methanol (methanol content was 0.16 mol % for lactic acid) was used and 48.9 g of polylactic acid was obtained as white solid.

The yield was 90.6%, the inherent viscosity was 0.51 dl/g, and the weight average molecular weight was 50.000 (converted to polystyrene).

EXAMPLE 3

The same procedures as described in Example 1 were carried out except that 90% L-lactic acid containing 70 ppm of methanol (methanol content was 0.02 mol % for lactic acid) was used and 49.3 g of polylactic acid was obtained as white solid.

The yield was 91.3%, the inherent viscosity was 2.15 dl/g, and the weight average molecular weight was 320,000 (converted to polystyrene).

EXAMPLE 4

The same procedures as described in Example 1 were carried out except that 75.0 g of 90% L-lactic acid containing 500 ppm of methanol and 9.6 g of 70% glycolic acid (methanol content was 0.14 mol % for raw materials) were used. A copolymer of L-lactic acid and glycolic acid was obtained as white solid.

The yield was 92.2%, the inherent viscosity was 1.12 dl/g, and the weight average molecular weight was 150,000 (converted to polystyrene).

EXAMPLE 5

The same procedures as described in Example 1 were carried out except that 75.0 g of 90% L-lactic acid containing 500 ppm of methanol and 6.8 g of DL-3-hydroxybutanoic acid (methanol content was 0.14 mol % for raw materials) were used. A copolymer of L-lactic acid and DL-3-hydroxybutanoic acid was obtained as white solid.

The yield was 94.1%, the inherent viscosity was 1.11 dl/g, and the weight average molecular weight was 150,000 (converted to polystyrene).

EXAMPLE 6

The same procedures as described in Example 1 were carried out except that 75.0 g of 90% L-lactic acid containing 500 ppm of methanol and 6.8 g of DL-4-hydroxybutanoic acid (methanol content was 0.14 mol % for raw materials) were used. A copolymer of L-lactic acid and DL-4-hydroxybutanoic acid was obtained as white solid.

The yield was 92.8%, the inherent viscosity was 0.95 dl/g, and the weight average molecular weight was 120,000 (converted to polystyrene).

EXAMPLE 7

The same procedures as described in Example 1 were carried out except that 60.0 g of 90 % L-lactic acid containing 500 ppm of methanol and 15.0 g of 90% DL-lactic acid (methanol content was 0.13 mol % for raw materials) were used.

The yield was 91.9%, the inherent viscosity was 1.42 dl/g, and the weight average molecular weight was 200,000 (converted to polystyrene).

COMPARATIVE EXAMPLE 1

The same procedures as described in Example 1 were carried out except that 90% L-lactic acid containing 1000 ppm of methanol (methanol content was 0.31 mol % for a raw material) was used and 48.1 g of polylactic acid was obtained as white solid.

The yield was 89.1%, the inherent viscosity was 0.25 dl/g, and the weight average molecular weight was 20,000 (converted to polystyrene).

EXAMPLE 8

After heat-stirring 75.0 g of 90 % L-lactic acid containing 500 ppm of methyl lactate (methyl lactate content was 0.05 mol % for lactic acid) at 130° C. for 3 hours under reduced pressure of 50 mmHg while removing water out of the reaction system, 325 g of diphenyl ether and 0.4 g of tin powder were added. A tube packed with 75 g of molecular sieve 3 A was thereafter mounted on the reaction vessel so as to return the solvent distilled out by refluxing to the reaction system by way of the molecular sieve. The reaction was further conducted at 130° C. for 30 hours under reduced pressure of 15 mmHg.

After finishing the reaction, the reaction mixture was dissolved in 400 ml of chloroform and tin powder was removed by suction filtering the resulting solution. The filtrate obtained was mixed with 1400 ml of methanol. The precipitated pale yellow solid was filtered and dried to obtain 50.1 g of polylactic acid.

The yield was 92.8%, the inherent viscosity was 1.30 dl/g, and the weight average molecular weight was 180,000 (converted to polystyrene).

EXAMPLE 9

The same procedures as described in Example 8 were carried out except that 90% L-lactic acid containing 1300 ppm of methyl lactate (methyl lactate content was 0.13 mol % for lactic acid) was used and 48.9 g of polylactic acid was obtained as white solid.

The yield was 90.6%, the inherent viscosity was 0.51 dl/g, and the weight average molecular weight was 50,000 (converted to polystyrene).

EXAMPLE 10

The same procedures as described in Example 8 were carried out except that 90% L-lactic acid containing 70 ppm of methyl lactate (methyl lactate content was 0.01 mol % for lactic acid) was used and 49.3 g of polylactic acid was obtained as white solid.

The yield was 91.3 %, the inherent viscosity was 2.15 dl/g, and the weight average molecular weight was 320.000 (converted to polystyrene).

EXAMPLE 11

The same procedures as described in Example 8 were carried out except that 75.0 g of 90% L-lactic acid containing 500 ppm of methyl lactate and 9.6 g of 70% glycolic acid (methyl lactate content was 0.04 mol % for raw materials) were used. A copolymer of L-lactic acid and glycolic acid was obtained as white solid.

The yield was 90.1%, the inherent viscosity was 1.11 dl/g, and the weight average molecular weight was 150,000 (converted to polystyrene).

EXAMPLE 12

The same procedures as described in Example 8 were carried out except that 75.0 g of 90 % L-lactic acid containing 500 ppm of methyl lactate and 6.8 g of DL-3-hydroxybutanoic acid (methyl lactate content was 0.04 mol % for raw materials) were used. A copolymer of L-lactic acid and DL-3-hydroxybutanoic acid was obtained as white solid.

The yield was 89.9%, the inherent viscosity was 1.13 dl/g, and the weight average molecular weight was 150,000 (converted to polystyrene).

EXAMPLE 13

The same procedures as described in Example 8 were carried out except that 75.0 g of 90% L-lactic acid containing 500 ppm of methyl lactate and 6.8 g of DL-4-hydroxybutanoic acid (methyl lactate content was 0.04 mol % for raw materials) were used. A copolymer of L-lactic acid and DL-4-hydroxybutanoic acid was obtained as white solid.

The yield was 95.1%, the inherent viscosity was 0.94 dl/g, and the weight average molecular weight was 120,000 (converted to polystyrene).

EXAMPLE 14

The same procedures as described in Example 8 were carried out except that 60.0 g of 90% L-lactic acid containing 350 ppm of methyl lactate and 15.0 g of 90% DL-lactic acid (methyl lactate content was 0.03 mol % for raw materials) were used. Polylactic acid was obtained as white solid.

The yield was 96.2 %, the inherent viscosity was 1.43 dl/g, and the weight average molecular weight was 200,000 (converted to polystyrene).

COMPARATIVE EXAMPLE 2

The same procedures as described in Example 8 were carried out except that 90% L-lactic acid containing 3200 ppm of methyl lactate (methyl lactate content was 0.31 mol % for lactic acid) was used and 48.1 g of polylactic acid was obtained as white solid.

The yield was 89.1%, the inherent viscosity was 0.25 dl/g, and the weight average molecular weight was 20,000 (converted to polystyrene).

EXAMPLE 15

After heat-stirring 75.0 g of 90% L-lactic acid containing 250 ppm of ethanol (ethanol content was 0.054 mol % for lactic acid used) at 130° C. for 3 hours under reduced pressure of 50 mmHg while removing water out of the reaction system. 325 g of diphenyl ether and 0.4 g of tin powder were added. A tube packed with 50 g of molecular sieve 3 A was thereafter mounted on the reaction vessel so as to return the solvent distilled out by refluxing to the reaction system by way of the molecular sieve. The reaction was further conducted at 130° C. for 30 hours under reduced pressure of 15 mmHg.

After finishing the reaction, the reaction mixture was dissolved in 400 ml of chloroform and tin powder was removed by suction filtering the resulting solution. The filtrate obtained was mixed with 1400 ml of methanol. The precipitated pale yellow solid was filtered and dried to obtain polylactic acid.

The yield was 91.9%, the inherent viscosity was 1.38 dl/g, and the weight average molecular weight was 190,000 (converted to polystyrene).

EXAMPLE 16

The same procedures as described in Example 15 were carried out except that 90% L-lactic acid containing 110 ppm of ethanol (ethanol content was 0.024 mol % for lactic acid used) was used. Polylactic acid was obtained as white solid.

The yield was 93.1%, the inherent viscosity was 2.05 dl/g, and the weight average molecular weight was 310,000 (converted to polystyrene).

EXAMPLE 17

The same procedures as described in Example 15 were carried out except that 90% L-lactic acid containing 850 ppm of ethanol (ethanol content was 0.185 mol % for lactic acid used) was used. Polylactic acid was obtained as white solid.

The yield was 88.1%, the inherent viscosity was 0.48 dl/g, and the weight average molecular weight was 45.000 (converted to polystyrene).

EXAMPLE 18

The same procedures as described in Example 15 were carried out except that 75.0 g of 90% L-lactic acid containing 250 ppm of ethanol and 15 g of 90% DL-lactic acid (ethanol content was 0.045 mol% for raw materials used) were used. Polylactic acid was obtained as white solid.

The yield was 90.0%, the inherent viscosity was 1.11 dl/g, and the weight average molecular weight was 147,000 (converted to polystyrene).

EXAMPLE 19

The same procedure as described in Example 15 were carried out except that 75.0 g of 90% L-lactic acid containing 250 ppm of ethanol and 9.6 g of 70 % glycolic acid (ethanol) content was 0.048 mol % for raw materials) were used. A copolymer of L-lactic acid and glycolic acid was obtained as white solid.

The yield was 87.2%, the inherent viscosity was 1.02 dl/g, and the weight average molecular weight was 131,000 (converted to polystyrene).

EXAMPLE 20

The same procedures as described in Example 15 were carried out except that 75 g of 90% L-lactic acid containing 250 ppm of ethanol and 6.8 g of DL-4-hydroxybutanoic acid (ethanol content was 0.05 mol % for raw materials) were used. A copolymer of L-lactic acid and DL-4-hydroxybutanoic acid was obtained as white solid.

The yield was 90.2%, the inherent viscosity was 1.00 dl/g, and the weight average molecular weight was 128,000 (converted to polystyrene).

EXAMPLE 21

The same procedures as described in Example 15 were carried out except that 75 g of 90 % L-lactic acid containing 250 ppm of ethanol and 6.8 g of DL-3-hydroxybutanoic acid (ethanol content was 0.05 mol % for raw materials) were used. A copolymer of L-lactic acid and DL-3-hydroxybutanoic acid was obtained as white solid.

The yield was 94.6%, the inherent viscosity was 1.15 dl/g, and the weight average molecular weight was 153,000 (converted to polystyrene).

COMPARATIVE EXAMPLE 3

The same procedures as described in Example 15 were carried out except that 90% L-lactic acid containing 1600 ppm of ethanol (ethanol content was 0.35 mol % for lactic acid). Polylactic acid was obtained as white solid.

The yield was 87.1%, the inherent viscosity was 0.27 dl/g, and the weight average molecular weight was 20,000 (converted to polystyrene).

EXAMPLE 22

After heat-stirring 75.0 g of 90% L-lactic acid containing 770 ppm of acetic acid (acetic acid content was 0.128 mol % for lactic acid used) at 130° C. for 3 hours under reduced pressure of 50 mmHg while removing water out of the reaction system. 325 g of diphenyl ether and 0.4 g of tin powder were added. A tube packed with 50 g of molecular sieve 3 A was thereafter mounted on the reaction vessel so as to return the solvent distilled out refluxing to the reaction system by way of the molecular sieve. The reaction was further conducted at 130° C. for 30 hours under reduced pressure of 15 mmHg.

After finishing the reaction, the reaction mixture was dissolved in 400 ml of chloroform and tin powder was removed by suction filtering the resulting solution. The filtrate obtained was mixed with 1400 ml of methanol. The precipitated pale yellow solid was filtered and dried to obtain 50.5 g of polylactic acid.

The yield was 93.5%, the inherent viscosity was 0.80 dl/g, and the weight average molecular weight was 100,000 (converted to polystyrene).

EXAMPLE 23

The same procedures as described in Example 22 were carried out except that 90% L-lactic acid containing 170 ppm of acetic acid (acetic acid content was 0.028 mol % for lactic acid used) was used and 51.2 g of polylactic acid was obtained as white solid.

The yield was 94.8%, the inherent viscosity was 2.10 dl/g, and the weight average molecular weight was 310,000 (converted to polystyrene).

EXAMPLE 24

The same procedures as described in Example 22 were carried out except that 10% L-lactic acid containing 300 ppm of acetic acid (acetic acid content was 0.050 mol % for lactic acid used) was used and 49.9 g of polylactic acid was obtained as white solid.

The yield was 92.4%, the inherent viscosity was 1.21 dl/g, and the weight average molecular weight was 165,000 (converted to polystyrene).

EXAMPLE 25

The same procedures as described in Example 22 were carried out except that 75.0 g of 90% L-lactic acid containing 170 ppm of acetic acid and 15 g of 90% DL-lactic acid (acetic acid content was 0.024 mol for lactic acid used) were used. Polylactic acid was obtained as white solid.

The yield was 91.7%, the inherent viscosity was 1.68 dl/g, and the weight average molecular weight was 242,000 (converted to polystyrene).

EXAMPLE 26

The same procedures as described in Example 22 were carried out except that 75.0 g of 90% L-lactic acid containing 300 ppm of acetic acid and 9.6 g of 70% glycolic acid (acetic acid content was 0.045 mol for raw materials) were used. A copolymer of L-lactic acid and glycolic acid was obtained as white solid.

The yield was 89.1%, the inherent viscosity was 1.08 dl/g, and the weight average molecular weight was 142,000 (converted to polystyrene).

EXAMPLE 27

The same procedures as described in Example 22 were carried out except that 75 g of 90% L-lactic acid containing 330 ppm of acetic acid and 6.8 g of DL-4-hydroxybutanoic acid (acetic acid content was 0.046 mol % for raw materials) were used. A copolymer of L-lactic acid and DL-4-hydroxybutanoic acid was obtained as white solid.

The yield was 88.4%, the inherent viscosity was 1.01 dl/g, and the weight average molecular weight was 131,000 (converted to polystyrene).

EXAMPLE 28

The same procedures as described in Example 22 were carried out except that 75 g of 90% L-lactic acid containing 300 ppm of acetic acid and 6.8 g of DL-3-hydroxybutanoic acid (acetic acid content was 0.046 mol % for raw materials) were used. A copolymer of L-lactic acid and DL-3-hydroxybutanoic acid was obtained as white solid.

The yield was 85.6%, the inherent viscosity was 1.14 dl/g, and the weight average molecular weight was 154,000 (converted to polystyrene).

COMPARATIVE EXAMPLE 4

The same procedures as described in Example 22 were carried out except that 90% 4-lactic acid containing 2800 ppm of acetic acid (acetic acid content was 0.47 mol % for lactic acid used) was used and 49.9 g of polylactic acid was obtained as white solid.

The yield was 92.4%, the inherent viscosity was 0.28 dl/g, and the weight average molecular weight was 20,000 (converted to polystyrene).

EXAMPLE 29

After heat-stirring 75.0 g of 90% L-lactic acid containing 550 ppm of pyruvic acid (pyruvic acid content was 0.062 mol % for lactic acid used) at 130° C. for 3 hours under reduced pressure of 50 mmHg while removing water out of the reaction system. 325 g of diphenyl ether and 0.4 g of tin powder were added. A tube packed with 50 g of molecular sieve 3A was thereafter mounted on the reaction vessel so as to return the solvent distilled out by refluxing to the reaction system by way of the molecular sieve. The reaction was further conducted at 130° C. for 30 hours under reduced pressure of 15 mmHg.

After finishing the reaction, the reaction mixture was dissolved in 400 ml of chloroform and tin powder was removed by suction filtering the resulting solution. The filtrate obtained was mixed with 1400 ml of methanol. The precipitated pale yellow solid was filtered and dried to obtain 51.1 g of polylactic acid.

The yield was 94.6%, the inherent viscosity was 1.05 dl/g, and the weight average molecular weight was 140,000 (converted to polystyrene).

EXAMPLE 30

The same procedures as described in Example 29 were carried out except that 90% L-lactic acid containing 250 ppm of pyruvic acid (pyruvic acid content was 0.028 mol % for lactic acid used) was used and 48.9 g of polylactic acid was obtained as white solid.

The yield was 90.6%, the inherent viscosity was 1.98 dl/g, and the weight average molecular weight was 290,000 (converted to polystyrene).

EXAMPLE 31

The same procedures as described in Example 29 were carried out except that 75 g of 90% L-lactic acid containing 250 ppm of pyruvic acid and 15 g of 90 % DL-lactic acid (pyruvic acid content was 0.024 mol % for lactic acid used) were used. Polylactic acid was obtained as white solid.

The yield was 91.1%, the inherent viscosity was 1.85 dl/g, and the weight average molecular weight was 271,000 (converted to polystyrene).

EXAMPLE 32

The same procedures as described in Example 29 were carried out except that 75.0 g of 90% L-lactic acid containing 250 ppm of pyruvic acid and 9.6 g of 70% glycolic acid (pyruvic acid content was 0.025 mol % for raw materials) were used. A-copolymer of L-lactic acid and glycolic acid was obtained as white solid.

The yield was 87.6%, the inherent viscosity was 1.34 dl/g, and the weight average molecular weight was 186,000 (converted to polystyrene).

EXAMPLE 33

The same procedures as described in Example 29 were carried out except that 75 g of 90% L-lactic acid containing 250 ppm of pyruvic acid and 6.8 g of DL-4-hydroxybutanoic acid (pyruvic acid content was 0.026 mol % for raw materials) were used. A copolymer of L-lactic acid and DL-4-hydroxybutanoic acid was obtained as white solid.

The yield was 90.3%, the inherent viscosity was 1.21 dl/g, and the weight average molecular weight was 165,000 (converted to polystyrene).

EXAMPLE 34

The same procedures as described in Example 29 were carried out except that 75 g of 90 % L-lactic acid containing 250 ppm of pyruvic acid and 6.8 g of DL-3-hydroxybutanoic acid (pyruvic acid content was 0.026 mol % for raw materials) were used. A copolymer of L-lactic acid and DL-3-hydroxybutanoic acid was obtained as white solid.

The yield was 88.4%, the inherent viscosity was 1.14 dl/g, and the weight average molecular weight was 152,000 (converted to polystyrene).

COMPARATIVE EXAMPLE 5

The same procedures as described in Example 29 were carried out except that 90% L-lactic acid containing 2760 ppm of pyruvic acid (pyruvic acid content was 0.313 mol % for lactic acid used) were used and polylactic acid was obtained as white solid.

The yield was 84.1%, the inherent viscosity was 0.26 dl/g, and the weight average molecular weight was 20,000 (converted to polystyrene).

EXAMPLE 35

After heat-stirring 75.0 g of 90% L-lactic acid containing 360 ppm of fumaric acid (fumaric acid content was 0.031 mol % for lactic acid used) at 130° C. for 3 hours under reduced pressure of 50 mmHg while removing water out of the reaction system, 325 g of diphenyl ether and 0.4 g of tin powder were added. A tube packed with 50 g of molecular sieve 3A was thereafter mounted on the reaction vessel so as to return the solvent distilled out by refluxing to the reaction system by way of the molecular sieve. The reaction was further conducted at 130° C. for 30 hours under reduced pressure of 15 mmHg.

After finishing the reaction, the reaction mixture was dissolved in 400 ml of chloroform and tin powder was removed by suction filtering the resulting solution. The filtrate obtained was mixed with 1400 ml of methanol. The precipitated white solid was filtered and dried to obtain 51.4 g of polylactic acid.

The yield was 95.1%, the inherent viscosity was 2.01 dl/g, and the weight average molecular weight was 300,000 (converted to polystyrene).

EXAMPLE 36

The same procedures as described in Example 35 were carried out except that 75 g of 90% L-lactic acid containing 163 ppm of fumaric acid (fumaric acid content was 0.014 mol % for lactic acid used) was used and 51.8 g of polylactic acid was obtained as white solid.

The yield was 96.1%, the inherent viscosity was 2.80 dl/g, and the weight average molecular weight was 460,000 (converted to polystyrene).

EXAMPLE 37

The same procedures as described in Example 35 were carried out except that 75 g of 90% L-lactic acid containing 360 ppm of fumaric acid and 15 g of 90% DL-lactic acid (fumaric acid content was 0.031 mol % for lactic acid used) were used and 59.8 g of polylactic acid was obtained as white solid.

The yield was 92.3%, the inherent viscosity was 1.42 dl/g, and the weight average molecular weight was 200,000 (converted to polystyrene).

EXAMPLE 38

The same procedures as described in Example 35 were carried out except that 75.0 g of 90% L-lactic acid containing 163 ppm of fumaric acid and 9.6 g of 70% glycolic acid (fumaric acid content was 0.0126 mol % for raw materials) were used. A copolymer of L-lactic acid and glycolic acid was obtained as white solid.

The yield was 91.5%, the inherent viscosity was 2.15 dl/g, and the weight average molecular weight was 320,000 (converted to polystyrene).

EXAMPLE 39

The same procedures as described in Example 35 were carried out except that 75 g of 90% L-lactic acid containing 163 ppm of fumaric acid and 6.8 g of DL-4-hydroxybutanoic acid (fumaric acid content was 0.013 mol % for raw materials) were used. A copolymer of L-lactic acid and DL-4-hydroxybutanoic acid was obtained as white solid.

The yield was 90.3%, the inherent viscosity was 1.78 dl/g, and the weight average molecular weight was 260,000 (converted to polystyrene).

EXAMPLE 40

The same procedures as described in Example 35 were carried out except that 75 g of 90% L-lactic acid containing 163 ppm of fumaric acid and 6.8 g of DL-3-hydroxybutanoic acid (fumaric acid content was 0.013 mol % for raw materials) were used. A copolymer of L-lactic acid and DL-3-hydroxybutanoic acid was obtained as white solid.

The yield was 90.5%, the inherent viscosity was 1.66 dl/g, and the weight average molecular weight was 240,000 (converted to polystyrene).

COMPARATIVE EXAMPLE 6

The same procedures as described in Example 35 were carried out except that 90% L-lactic acid containing 3700 ppm of fumaric acid (fumaric acid content was 0.319 mol % for lactic acid used) was used and polylactic acid was obtained as white solid.

The yield was 84.1%, the inherent viscosity was 0.23 dl/g, and the weight average molecular weight was 20,000 (converted to polystyrene).

EXAMPLE 41

After heat-stirring 75.0 g of 90 % L-lactic acid containing 730 ppm of ethyl lactate (ethyl lactate content was 0.062 mol % for lactic acid used) at 130° C. for 3 hours under reduced pressure of 50 mmHg while removing water out of the reaction system, 325 g of diphenyl ether and 0.4 g of tin powder were added. A tube packed with 50 g of molecular sieve 3A was thereafter mounted on the reaction vessel so as to return the solvent distilled out by refluxing to the reaction system by way of the molecular sieve. The reaction was further conducted at 130° C. for 30 hours under reduced pressure of 15 mmHg.

After finishing the reaction, the reaction mixture was dissolved in 400 ml of chloroform and tin powder was removed by suction filtering the resulting solution. The filtrate obtained was mixed with 1400 ml of methanol. The precipitated white solid was filtered and dried to obtain 51.4 g of polylactic acid.

The yield was 95.3%, the inherent viscosity was 2.02 dl/g, and the weight average molecular weight was 300,000 (converted to polystyrene).

EXAMPLE 42

The same procedures as described in Example 41 were carried out except that 75 g of 90% L-lactic acid containing 330 ppm of ethyl lactate (ethyl lactate content was 0.028 mol % for lactic acid used) was used and 51.6 g of polylactic acid was obtained as white solid.

The yield was 95.5%, the inherent viscosity was 2.60 dl/g, and the weight average molecular weight was 420,000 (converted to polystyrene).

EXAMPLE 43

The same procedures as described in Example 41 were carried out except that 75 g of 90% L-lactic acid containing 330 ppm of ethyl lactate and 15 g of 90% DL-lactic acid (ethyl lactate content was 0.0275 mol % for lactic acid used) were used and 56.8 g of polylactic acid was obtained as white solid.

The yield was 91.1%, the inherent viscosity was 1.97 dl/g, and the weight average molecular weight was 290,000 (converted to polystyrene).

EXAMPLE 44

The same procedures as described in Example 41 were carried out except that 75.0 g of 90% L-lactic acid containing 730 ppm of ethyl lactate and 9.6 g of 70% glycolic acid (ethyl lactate content was 0.055 mol % for raw materials) were used. A copolymer of L-lactic acid and glycolic acid was obtained as white solid.

The yield was 88.0%, the inherent viscosity was 1.60 dl/g, and the weight average molecular weight was 230,000 (converted to polystyrene).

EXAMPLE 45

The same procedures as described in Example 41 were carried out except that 75 g of 90% L-lactic acid containing 730 ppm of ethyl lactate and 6.8 g of DL-4-hydroxybutanoic acid (ethyl lactate content was 0.057 mol % for raw materials) were used. A copolymer of L-lactic acid and DL-4-hydroxybutanoic acid was obtained as white solid.

The yield was 91.1%, the inherent viscosity was 1.48 dl/g, and the weight average molecular weight was 210,000 (converted to polystyrene).

EXAMPLE 46

The same procedures as described in Example 41 were carried out except that 75 g of 90% L-lactic acid containing 730 ppm of ethyl lactate and 6.8 g of DL-3-hydroxybutanoic acid (ethyl lactate content was 0.057 mol % for raw materials) were used. A copolymer of L-lactic acid and DL-3-hydroxybutanoic acid was obtained as white solid.

The yield was 90.2%, the inherent viscosity was 1.54 dl/g, and the weight average molecular weight was 218,000 (converted to polystyrene).

COMPARATIVE EXAMPLE 7

The same procedures as described in Example 41 were carried out except that 90% L-lactic acid containing 4100 ppm of ethyl lactate (ethyl lactate content was 0.347 mol % for lactic acid used) was used and polylactic acid was obtained as white solid.

The yield was 83.8%, the inherent viscosity was 0.28 dl/g, and the weight average molecular weight was 20,000 (converted to polystyrene).

EXAMPLE 47

After heat-stirring 75.0 g of 90% L-lactic acid containing 730 ppm of butyl lactate (butyl lactate content was 0.085 mol % for lactic acid used) at 130° C. for 3 hours under reduced pressure of 50 mmHg while removing water out of the reaction system, 325 g of diphenyl ether and 0.4 g of tin powder were added. A tube packed with 50 g of molecular sieve 3A was thereafter mounted on the reaction vessel so as to return the solvent distilled out by refluxing to the reaction system by way of the molecular sieve. The reaction was further conducted at 130° C. for 30 hours under reduced pressure of 15 mmHg.

After finishing the reaction, the reaction mixture was dissolved in 400 ml of chloroform and tin powder was removed by suction filtering the resulting solution. The filtrate obtained was mixed with 1400 ml of methanol. The precipitated white solid was filtered and dried to obtain 51.2 g of polylactic acid.

The yield was 94.8%, the inherent viscosity was 1.65 dl/g, and the weight average molecular weight was 240,000 (converted to polystyrene).

EXAMPLE 48

The same procedures as described in Example 47 were carried out except that 75 g of 90% L-lactic acid containing 730 ppm of butyl lactate (butyl lactate content was 0.050 mol % for lactic acid used) was used and 51.3 g of polylactic acid was obtained as white solid.

The yield was 95.0%, the inherent viscosity was 2.20 dl/g, and the weight average molecular weight was 330,000 (converted to polystyrene).

EXAMPLE 49

The same procedures as described in Example 47 were carried out except that 75 g of 90% L-lactic acid containing 730 ppm of butyl lactate and 15 g of 90% DL-lactic acid (butyl lactate content was 0.042 mol % for lactic acid used) were used and 56.8 g of polylactic acid was obtained as white solid.

The yield was 91.1%, the inherent viscosity was 1.96 dl/g, and the weight average molecular weight was 290,000 (converted to polystyrene).

EXAMPLE 50

The same procedures as described in Example 47 were carried out except that 75.0 g of 90% L-lactic acid containing 1240 ppm of butyl lactate and 9.6 g of 70% glycolic acid (butyl lactate content was 0.075 mol % for raw materials) were used. A copolymer of L-lactic acid and glycolic acid was obtained as white solid and had an weight average molecular weight of 173,000 (converted to polystyrene).

The yield was 89.8%, the inherent viscosity was 1.26 dl/g, and the weight average molecular weight was 173,000 (converted to polystyrene).

EXAMPLE 51

The same procedures as described in Example 47 were carried out except that 75 g of 90% L-lactic acid containing 730 ppm of butyl lactate and 6.8 g of DL-4-hydroxybutanoic acid (butyl lactate content was 0.046 mol % for raw materials) were used. A copolymer of L-lactic acid and DL-4-hydroxybutanoic acid was obtained as white solid.

The yield was 90.6%, the inherent viscosity was 1.87 dl/g, and the weight average molecular weight was 275,000 (converted to polystyrene).

EXAMPLE 52

The same procedures as described in Example 47 were carried out except that 75 g of 90% L-lactic acid containing 730 ppm of butyl lactate and 6.8 g of DL-3-hydroxybutanoic acid (butyl lactate content was 0.046 mol % for raw materials) were used. A copolymer of L-lactic acid and DL-3-hydroxybutanoic acid was obtained as white solid.

The yield was 89.2%, the inherent viscosity was 1.83 dl/g, and the weight average molecular weight was 268,000 (converted to polystyrene).

COMPARATIVE EXAMPLE 8

The same procedures as described in Example 47 were carried out except that 90% L-lactic acid containing 5560 ppm of butyl lactate (butyl lactate content was 0.380 mol % for lactic acid used) was used and polylactic acid was obtained as white solid.

The yield was 86.2%, the inherent viscosity was 0.27 dl/g, and the weight average molecular weight was 20,000 (converted to polystyrene).

EXAMPLE 53

The same procedures as described in Example 1 were carried out except that 75 g of 90% L-lactic acid containing 850 ppm of pyruvic acid and 350 ppm of acetic acid (total amount of pyruvic acid and acetic acid was 0.16 mol % for the amount of lactic acid used) was used. Polylactic acid was obtained as white solid.

The yield was 93.4 %, the inherent viscosity was 0.78 dl/g, and the weight average molecular weight was 100.000 (converted to polystyrene).

EXAMPLE 54

The same procedures as described in Example 1 were carried out except that 75 g of 90% L-lactic acid containing 330 ppm of pyruvic acid 80 ppm of acetic acid and 140 ppm fumaric acid (total amount of pyruvic acid, acetic acid and fumaric acid was 0.06 mol % for the amount of the lactic acid used) was used. Polylactic acid was obtained as white solid.

The yield was 91.3%, the inherent viscosity was 1.27 dl/g and the weight average molecular weight was 180,000 (converted to polystyrene).

EXAMPLE 55

The same procedures as described in Example i were carried out except that 75 g of 90% L-lactic acid containing 250 ppm of pyruvic acid, 150 ppm of acetic acid. 60 ppm of ethanol and 90 ppm of ethyl lactate (total amount of pyruvic acid, acetic acid, ethanol and ethyl lactate was 0.07 mol % for the amount of lactic acid used) was used. Polylactic acid was obtained as white solid.

The yield was 92.8%, the inherent viscosity was 1.28 dl,/g and the weight average molecular weight was 185.000 (converted to polystyrene).

EXAMPLE 56

The same procedures as described in Example 1 were carried out except that 75 g of 90% L-lactic acid containing 130 ppm of methanol and 500 ppm of methyl lactate (amount of methanol and methyl lactate was 0.09 mol % for the amount of lactic acid used) was used. Polylactic acid was obtained as white solid.

The yield was 90.1%, the inherent viscosity was 1.53 dl/g and the weight average molecular weight was 225,000 (converted to polystyrene).

EXAMPLE 57

The same procedures as described in Example 1 were carried out except that 75 g of 90% L-lactic acid containing 250 ppm of pyruvic acid, 350 ppm of acetic acid, 50 ppm of methanol and 110 ppm of methyl lactate (total amount of pyruvic acid, acetic acid, methanol and methyl lactate was 0.10 mol % for the amount of lactic acid used) was used. Polylactic acid was obtained as white solid.

The yield was 93.3%, the inherent viscosity was 1.23 dl/g and the weight average molecular weight was 175,000 (converted to polystyrene).

EXAMPLE 58

The same procedures as described in Example 1 were carried out except that 880 ppm of pyruvic acid, 150 ppm of acetic acid, 100 ppm of methanol and 500 ppm of methyl lactate (total amount of pyruvic acid, acetic acid, methanol and methyl lactate was 0.20 mol % for the amount of lactic acid used) was used. Polylactic acid was obtained as white solid.

The yield was 90.0%, the inherent viscosity was 0.70 dl/g and the weight average molecular weight was 80,000 (converted to polystyrene).

EXAMPLE 59

The same procedure as described in Example 1 were carried out except that 75 g of 90% L-lactic acid containing 330 ppm of pyruvic acid, 80 ppm of acetic acid and 430 ppm of butyl lactate (total amount of pyruvic acid, acetic acid and butyl lactate was 0.08 mol % for the amount of lactic acid used) was used. Polylactic acid was obtained as white solid.

The yield was 89.3%, the inherent viscosity was 1.23 d l/g and the weight average molecular weight was 180,000 (converted to polystyrene).

COMPARATIVE EXAMPLE 9

The same procedures as described in Example 1 were carried out except that 75 g of 90% L-lactic acid containing 1835 ppm of pyruvic acid and 1100 ppm of acetic acid (total amount of pyruvic acid and acetic acid was 0.39 mol % for the amount of lactic acid used) was used. Polylactic acid was obtained as white crystal.

The yield was 86.3%, the inherent viscosity was 0.19 dl/g and the weight average molecular weight was 19,000 (converted to polystyrene).

COMPARATIVE EXAMPLE 10

The same procedures as described in Example 1 were carried out except that 75 g of 90% L-lactic acid containing 1265 ppm of pyruvic acid 865 ppm of acetic acid 10 ppm of methanol and 500 ppm of methyl lactate (total amount of pyruvic acid, acetic acid, methanol and methyl lactate was 0.34 mol % for the amount of lactic acid used) was used. Polylactic acid was obtained as white solid.

The yield was 87.9%, the inherent viscosity was 0.26 dl/g and the weight average molecular weight was 22,000 (converted to polystyrene).

COMPARATIVE EXAMPLE 11

The same procedures as described in Example 1 were carried out except that 75 g of 90% L-lactic acid containing 1350 ppm of pyruvic acid, 730 ppm of acetic acid 80 ppm of ethanol and 670 ppm of ethyl lactate (total amount of pyruvic acid, acetic acid, ethanol and ethyl lactate was 0.35 mol % for the amount of raw materials) was used. Polylactic acid was obtained as white solid.

The yield was 92.2%, the inherent viscosity was 0.24 dl/g and the weight average molecular weight was 22,000 (converted to polystyrene).

However, these examples are not intended to limit the scope of the present invention. This may be practiced or embodied in still other ways without departing from the spirit or essential character thereof.

We claim:

1. Lactic acid containing hydroxycarboxylic acid for use in the preparation of polyhydroxycarboxylic acid having an inherent viscosity of 0.3 dl/g or more, comprising one or more impurities selected from the group consisting of methanol, ethanol, acetic acid, pyruvic acid, fumaric acid, methyl lactate, ethyl lactate and butyl lactate in a total amount of 0.3% by mole or less for the amount of said lactic acid containing hydroxycarboxylic acid.

2. The lactic acid containing hydroxycarboxylic acid of claim 1 wherein the impurity is methanol.

3. The lactic acid containing hydroxycarboxylic acid of claim 1 wherein the impurity is ethanol.

4. The lactic acid containing hydroxycarboxylic acid of claim 1 wherein the impurity is acetic acid.

5. The lactic acid containing hydroxycarboxylic acid of claim 1 wherein the impurity is pyruvic acid.

6. The lactic acid containing hydroxycarboxylic acid of claim 1 wherein the impurity is fumaric acid.

7. The lactic acid containing hydroxycarboxylic acid of claim 1 wherein the impurity is methyl lactate.

8. The lactic acid containing hydroxycarboxylic acid of claim 1 wherein the impurity is ethyl lactate.

9. The lactic acid containing hydroxycarboxylic acid of claim 1 wherein the impurity is butyl lactate.

10. The lactic acid containing hydroxycarboxylic acid of claim 1 wherein the lactic acid containing hydroxycarboxylic acid is lactic acid.

11. The lactic acid containing hydroxycarboxylic acid of claim 1 wherein the lactic acid containing hydroxycarboxylic acid is glycolic acid, hydroxybutanoic acid or hydroxyhexanoic acid.

12. The lactic acid containing hydroxycarboxylic acid of claim 11 wherein the hydroxybutanoic acid is 3-hydroxybutanoic acid or 4-hydroxybutanoic acid.

13. The lactic acid containing hydroxycarboxylic acid of claim 1 wherein the lactic acid is L-lactic acid, D-lactic acid or DL-lactic acid.

14. The lactic acid containing hydroxycarboxylic acid of claim 13 wherein the lactic acid is derived from starch.

15. The lactic acid containing hydroxycarboxylic acid of claim 1 wherein the one or more impurities are present in a total amount of 0.1% by mole or less.

16. The lactic acid containing hydroxycarboxylic acid of claim 1 wherein the one or more impurities are present in a total amount of 0.05% by mole or less.

* * * * *